United States Patent [19]

Neufeld

[11] Patent Number: 4,662,585
[45] Date of Patent: May 5, 1987

[54] THUMB STOP WITH INTEGRAL SPRING

[76] Inventor: Henry L. Neufeld, c/o Zebco Div., Brunswick; 6101 E. Apache St., Tulsa, Okla. 74101

[21] Appl. No.: 758,758

[22] Filed: Jul. 25, 1985

[51] Int. Cl.⁴ .............................................. A01K 89/01
[52] U.S. Cl. .................................. 242/84.2 A; 74/555
[58] Field of Search ................ 242/84.2 A, 84.21 A, 242/84.5 P; 74/555

[56] References Cited

U.S. PATENT DOCUMENTS

| | | | |
|---|---|---|---|
| 2,863,617 | 12/1958 | Chapin et al. | 242/84.5 P |
| 3,034,741 | 5/1962 | Macy et al. | 242/84.2 A |
| 3,108,760 | 10/1963 | Nurmse | 242/84.2 A |
| 3,481,554 | 12/1969 | Hull . | |
| 4,156,510 | 5/1979 | Hull . | |
| 4,415,129 | 11/1983 | Neufeld . | |

Primary Examiner—Billy S. Taylor

[57] ABSTRACT

A thumb button is disclosed for use in a fishing reel having a rotatable spinner head retained within a housing, the spinner head being displaceable axially by depressing the thumb button. Stops are associated with the thumb button to confine rearward rotation of the button away from a depressed position. Pivots are operatively associated between the thumb button and the housing, the thumb button being pivotable about the pivots. A spring tab is molded as an integral part of the thumb button for engaging the inside of the housing to constantly maintain the spring means and, thereby, the thumb button under loaded condition.

5 Claims, 2 Drawing Figures

U.S. Patent  May 5, 1987  4,662,585
FIG. 1.
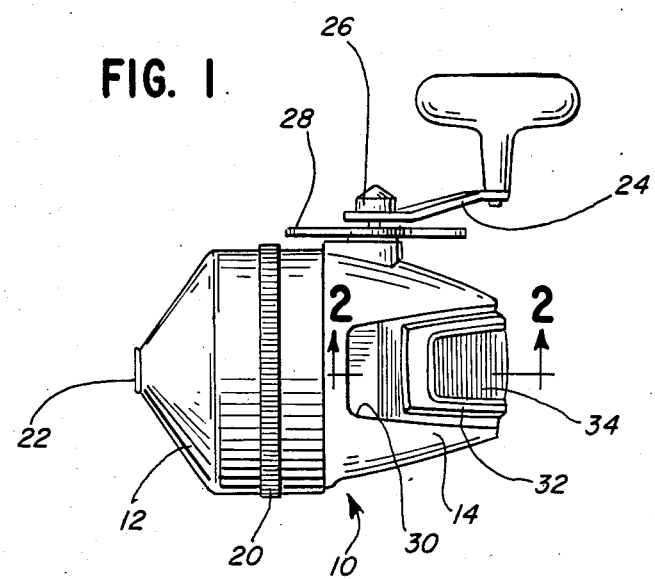
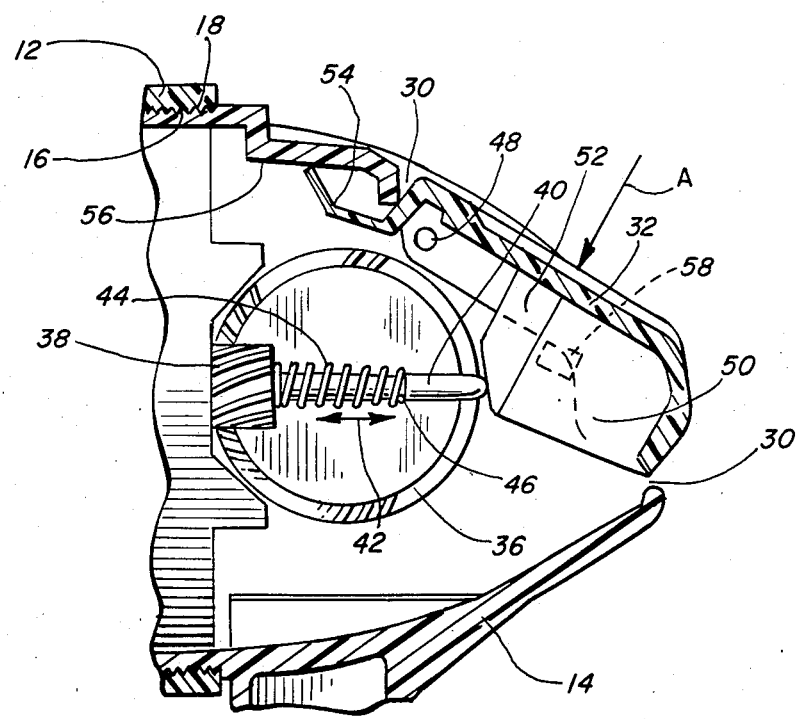
FIG. 2

THUMB STOP WITH INTEGRAL SPRING

BACKGROUND OF THE INVENTION

This invention relates to spinning or spincast style fishing reels and, more particularly, to an improved, integral spring means for the thumb button of the fishing reel.

In traditional spincast, and sometimes spinning, reel constructions, a depressible thumb button is pivotally mounted to the reel housing for displacing a spinner head through an intermediate center shaft. As exemplified in the spincast reel disclosed in U.S. Pat. Nos. 3,481,554 and 4,156,510 to Hull issued respectively on Dec. 2, 1969 and May 29, 1979, a pair or opposed sidewardly extending pivots adjacent the forward portion of the thumb button are snapped into slotted pivot openings in the walls of the rear cover. One or more tabs integrally formed with the button may be included toward the rear of the button to abut a ledge on the inner surface of the rear cover to confine the rearward pivoting of the thumb button away from a depressed position. Unrestrained pivoting of the thumb button occurs between a rearmost position and simply a rearward position where the button engages the center shaft, when a biasing means is absent as is common in early reel constructions. Consequently, an undesirable rattling might occur as the thumb button pivots within the reel housing. With the reel in a substantially upright position, the weight of the thumb button urges the same into engagement with the center shaft which causes wear on the button as well as aggravating the rattling problem. Additionally, when the thumb button is depressed from adjacent its forward edge or the button is urged in a forward direction, the pivots tend to disengage from the pivot openings because resistance is provided only by the restraining force of the walls of the pivot openings on the captured pivots, again in absence of any biasing means.

In order to solve these problems, spring means have been used in operative engagement between the reel housing and the pivotable thumb button to urge the button upwardly and away from its depressed position. In my U.S. Pat. No. 4,415,129, issued on Nov. 15, 1983, I disclose the use of a spring means engageable with the reel housing and the pivotable thumb button to urge the button upwardly and away from its depressed position. The spring means comprise one or more elongate resilient legs which are engageable with and retained by a tab depending from the reel cover. The spring means, by maintaining constant pressure on the button, prevents rattling, yet offers minimal resistance to the depression of the button by an operator. The rearwardly directed component of the spring force on the thumb button resists dislocation of the sidewardly extending pivots from the slotted pivot openings within which the pivots are seated. This patent is incorporated herein by reference.

However, it should be noted that the use of a separate spring, as disclosed in my aforesaid patent, requires separate tooling for making the spring. For instance, the spring may be a stamped part which requires a separate tool. In addition, tooling is required for assembly of the separate spring to the thumb button and/or housing, along with all of the accompanying labor costs. Furthermore, the mounting means for such separate springs can become loosened through wear or abuse and result in rattling.

This invention is directed to an improved, integral spring means which is extremely simple and cost effective and overcomes many of the problems set forth above.

SUMMARY OF THE INVENTION

An object, therefore, of the invention is to provide a spincast or spinning style fishing reel with an improved spring means.

In the exemplary embodiment of the invention, the spring means is designed for use in a fishing reel having a rotatable spinner head retained within a housing, the spinner head being displaceable axially by depressing a pivotable thumb button. Stop means are associated with the thumb button to confine rearward rotation of the button away from its depressed position. Pivot means are operatively associated with the thumb button and the housing, the button being pivotable about the pivot means. Spring means are formed integrally with the thumb button for biasing the button toward a rearward stop position.

As disclosed herein, the spring means comprises an elongated tab molded as an integral part of the thumb button. The tab projects forwardly of the button and is located for engaging the inside of the housing to constantly maintain the spring means under loaded condition, thereby eliminating rattling.

Other objects, features, and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a top view of a spincast fishing reel with a depressible thumb button; and FIG. 2 is a fragmented vertical section, on an enlarged scale, taken generally along line 2—2 of FIG. 1.

DETAILED DESCRIPTION OF THE PREFERRED EMBODIMENT

Referring to the drawings in greater detail, and first to FIG. 1, a spincast type fishing reel is shown and includes a closed face housing, generally designated 10, comprising a front cup-shaped cover 12 and a rear cup-shaped cover 14. The front cover has internal threads 16 (FIG. 2) formed on the rearmost internal surface thereof. The rear cover has external threads 18 formed on a forwardly facing end portion thereof for mating with the internal threaded portion of the front cover. A knurled gripping ring 20 is formed about the outside of front cover 12 to facilitate manual rotation of the front cover. An annular line guide 22 is mounted at the forward edge of front cover 12. A crank shaft (not shown) has a handle 24 secured to the outer distal end thereof by a nut 26. A star wheel 28 is rotatable relative to the crank shaft and about the same axis for controlling the reel drag. The rear cover 14 has a rearwardly facing opening 30 that is substantially rectangular in shape and extending through a sloped upper portion and vertical rear portion of the cover. A one-piece thumb button 32 has a shape substantially mating with the shape of opening 30 in the rear cover. The upper surface of the thumb button is serrated, as at 34, which prevents an operator's thumb or finger from slipping as the button is depressed.

Referring to FIG. 2, handle 24, through the crank shaft, rotates a cup gear 36 which is meshed with a pinion gear 38 fixed to a center shaft 40 for rotating the shaft. The center shaft rotates the spinner head of the reel and is mounted for fore and aft movement in the direction of double-headed arrow 42 in FIG. 2. Movement of the center shaft 40 in a forward direction releases the spinner head for casting. A coil spring 44 embraces the center shaft and abuts against a shoulder 46 of the shaft to bias the shaft rearwardly. The remaining specific mechanism through which the reel is operated is generally known and does not form a part of this invention and thus a detailed discussion of the same is omitted.

Still referring to FIG. 2, a pair of opposed pivots 48 extend outwardly from the side of push button 32 and snap into appropriate slotted openings in the adjacent side walls of opening 30, as is known. Center shaft 40 is displaced axially forwardly by depressing thumb button 32 inwardly in the direction of arrow "A" to rotate the button about pivots 48 in a clockwise direction as viewed in FIG. 2. Upon depressing the button, a protruding ledge 50 depending from the underside of the button engages the distal end of center shaft 40 moving the shaft in the forward direction. The ledge has a wider forward portion 52 for actually engaging the center shaft.

Upon release of thumb button 32, spring means 54 biases the button in a counter-clockwise direction to permit spring 44 to return center shaft 40 to the right end FIG. 2.

More particularly, spring means 54 is formed as an elongated tab projecting forwardly of thumb button 32 for constantly engaging an inner wall 56 of housing rear cover 14. The tab is molded as an integral part of the thumb button.

Stop means in the form of a pair of sidewardly extending tabs 58 on thumb button 32 engage under appropriate ledges on the inside of the rear cover. This stop means confines rearward rotation of the thumb button from its depressed position. It can be seen from FIG. 2 that even in the rearmost position of the thumb button, integral spring tab 54 is maintained in constant engagement with the inside of the housing thereby to constantly maintain the spring means under tension or loaded condition. This prevents rattling of the thumb button regardless of its position. In other words, the spring tab can be sufficiently bent and maintained under tension to constantly maintain the thumb button spring-loaded. This structure compensates for wear during a long life for the reel without ever permitting the thumb button to rattle. The thumb button 32, spring tab 54, pivots 48 and stops 58 all can be molded as a unitary plastic component.

It will be understood that the invention may be embodied in other specific forms without departing from the spirit or central characteristic thereof. The present examples and embodiments, therefore, are to be considered in all respects as illustrative and not restrictive, and the invention is not to be limited to the details given herein.

I claim:

1. In a fishing reel having a rotatable spinner head retained within a housing including stationary means, the spinner head being displaceable axially by depressing a pivotable thumb button, and stop means associated with the thumb button to confine rearward rotation of the button away from its depressed position, the improvement comprising:
    pivot means operatively associated between the thumb button and the housing, the button being pivotable about the pivot means; and
    spring means molded as an integral part of the thumb button for engaging the stationary means on the housing to constantly maintain the spring means under loaded condition, and for biasing the button toward a rearward stop position.

2. The fishing reel of claim 1 wherein said spring means comprises an integral elongated tab projecting forwardly of the thumb button.

3. The fishing reel of claim 2 wherein the stationary means is the inside of the housing.

4. In a fishing reel having a rotatable spinner head retained within a housing, the spinner head being displaceable axially by depressing a pivotable thumb button, and stop means associated with the thumb button to confine rearward rotation of the button away from its depressed position, the improvement comprising;
    pivot means operatively associated between the thumb button and the housing, the button being pivotable about the pivot means, and the button projecting rearwardly of the pivot means and exposed through an opening in the housing; and
    an elongated spring tab molded as an integral part of the thumb button and projecting forwardly of the pivot means into engagement with the inside of the housing to constantly maintain the spring tab and, thereby, the thumb button under loaded condition.

5. The fishing reel of claim 4 wherein the thumb button, the spring tab, the pivot means and the stop means all are molded as a unitary plastic component.

* * * * *